May 30, 1944. F. G. BACK 2,349,932
APPARATUS FOR TAKING PHOTOGRAPHS OF CAVITIES OF THE BODY
Filed Jan. 29, 1943 2 Sheets-Sheet 1
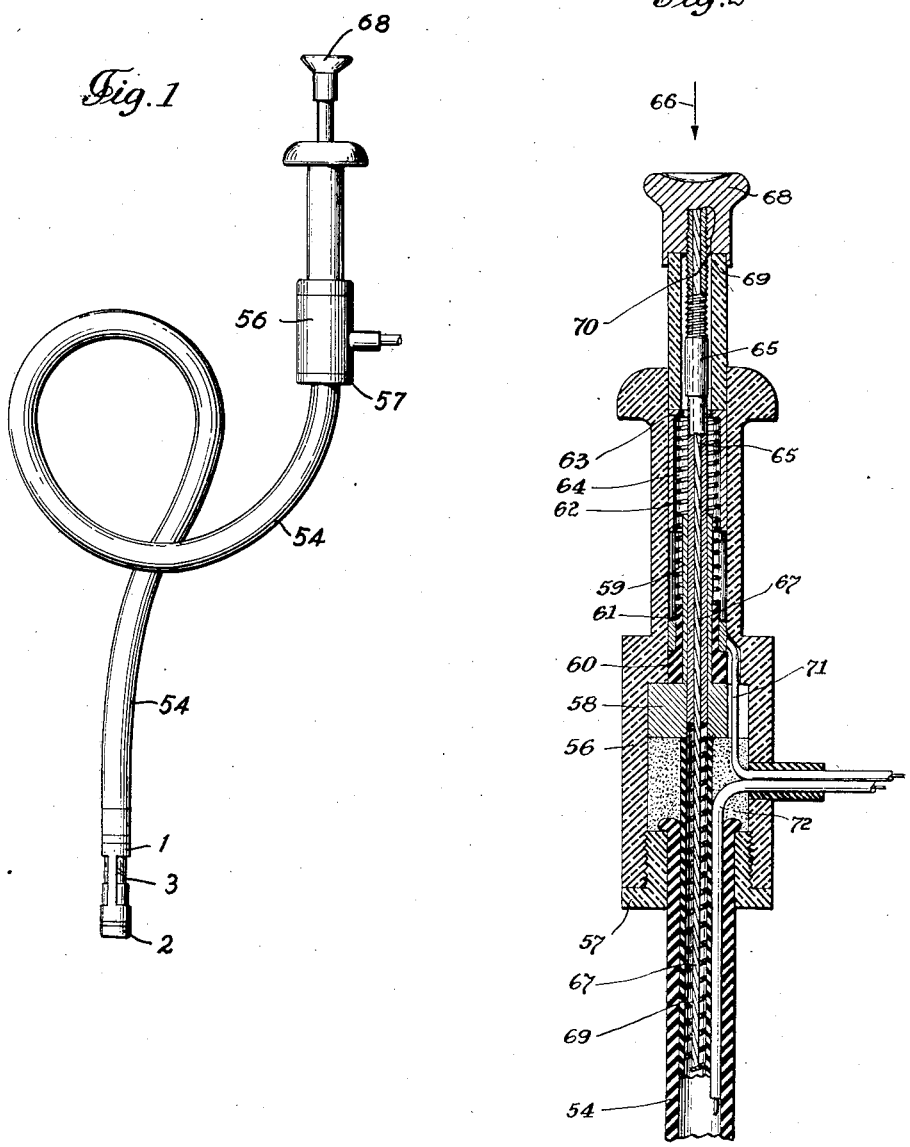
INVENTOR:
Franz G. Back May 30, 1944. F. G. BACK 2,349,932
APPARATUS FOR TAKING PHOTOGRAPHS OF CAVITIES OF THE BODY
Filed Jan. 29, 1943 2 Sheets-Sheet 2

INVENTOR:
Franz G. Back
BY
his agent

Patented May 30, 1944

2,349,932

UNITED STATES PATENT OFFICE 2,349,932

APPARATUS FOR TAKING PHOTOGRAPHS OF CAVITIES OF THE BODY

Franz G. Back, New York, N. Y., assignor to Gastro-Photor Laboratories, New York, N. Y.

Application January 29, 1943, Serial No. 473,926

15 Claims. (Cl. 95—11)

My present invention relates to apparatus for taking photographs of cavities of the body described and shown in the United States Patent No. 1,828,141, issued to me on October 20, 1931.

One of the objects of my present invention is to facilitate taking of photographs with apparatus of this type by providing means for simultaneously operating the shutter mechanism and the lighting device of the camera.

It is a further object of my present invention to provide these combined means for operating the shutter mechanism and the lighting device in the handle of the photographic apparatus, thereby making photographing with such a camera extremely simple and expedient.

It is still a further object of my present invention to construct the camera unit itself in such a manner that it might be detached from the means operating the shutter without opening of any of the exposure chambers of the camera, i. e., without exposing to light the films on which the photographs have been taken.

Another object of my present invention consists in modifying the shape of the camera in such a manner as to facilitate its introduction into cavities of the human body.

With the above objects in view, my present invention relates mainly to photographic apparatus comprising in combination a pair of tubular cameras provided each with one or more exposure chambers, a lighting device between these cameras secured to the same and forming with them one unitary camera structure, a shutter mechanism for these cameras slidably secured to this unitary camera structure, and a shutter operating mechanism detachably secured to this camera structure and to the shutter mechanism for moving the same relative to each other, and consists of cover means for the exposure chambers of cameras of the above type constructed in such a manner as to close the same light-tightly also when the shutter operating mechanism is detached from the camera structure and from the shutter mechanism secured thereto.

I furthermore propose to provide that camera which is first introduced into the cavity to be photographed with a cover having a substantially hemispherical outer surface in order to facilitate introduction of the entire camera structure into the cavity to be photographed. I also propose to make this cover of metal instead of rubber as done up to now as such modification greatly facilitates sliding of the camera along the walls of the cavity to be photographed.

Another improvement proposed by me herewith consists in constructing the shutter operating mechanism in such a manner that the same not only operates the shutter mechanism itself but also automatically closes the electric circuit for operating the lighting device. This enables simultaneous lighting of the cavity to be photographed and exposure of the films in the camera by one single movement of the shutter operating mechanism. Preferably, this shutter operating mechanism is contained in an operating handle remaining outside of the cavity to be photographed.

The novel features which I consider characteristic for my invention are set forth in particular in the appended claims. The invention itself, however, both as to its construction and its method of operation, together with additional objects and advantages thereof, will be best understood from the following description of specific embodiments, when read in connection with the accompanying drawings, in which:

Figure 1 is a view showing the complete photographic apparatus;

Figure 2 is a longitudinal section through the operating handle by which the camera is manipulated;

Figure 3:
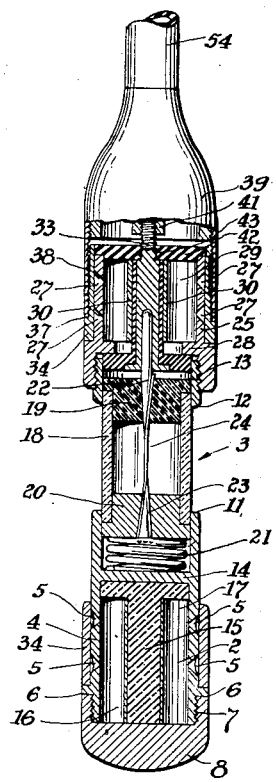
Figure 3 is an elevational section through the cameras, lighting device, and shutter mechanism with the shutter mechanism closing the diaphragm openings in the cameras.
Figure 7:
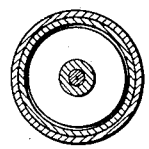
Figure 7 is a cross section through the shutter and the upper cap along line 7—7 of Figure 4.

My improved apparatus comprises an upper camera designated 1 and a lower camera designated 2 with a lighting device 3 arranged between the same. The cameras 1 and 2 and the lighting device 3 are tubular in form and longitudinally aligned.

The lower camera 2 comprises a tubular member 4 provided in the walls thereof with four sets of pinhole diaphragms 5. The lower end of camera 2 is shouldered at 6 and screw-threaded at 7 for the purpose of receiving a metallic hemispherical cap 8 which, when in place, abuts the under side of shoulder 6. The hemispherical shape of this cap facilitates, as explained above, the introduction into the cavity to be photographed of the unitary camera structure, i. e. the two cameras 1 and 2 and the lighting device 3 arranged between the same.

Figure 5:
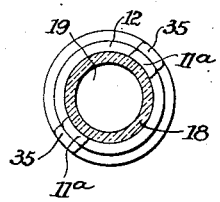
Figure 5 is a cross section through the lighting device and shutter along line 5—5 of Figure 4.

The wall of tube 4 above the diaphragms 5 therein is cut away or cut out as shown at 11, to provide a skeleton structure 11a extending longitudinally of the tube as shown in Figure 5. The upper end of this structure is shouldered as shown at 12 and screw-threaded at 13.

The interior of the tube 4 is provided a short distance below the part designated 11 with an internal transverse partition 14. Below and abutting this partition is a removable spider 15 of suitable insulating material, as for instance hard rubber or Bakelite, this spider being provided with longitudinally extending curved faces 16 which are disposed at an angle of 90° with respect to each other. Each of these curved surfaces 16 is preferably equidistant from the inner end of the pin hole diaphragms 5, the curve thereof being struck with the inner ends of the diaphragms as a center.

Figure 6:
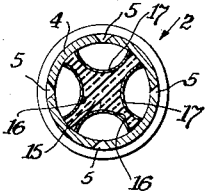
Figure 6 is a cross section through one of the cameras along line 6—6 of Figure 4.

The spider 15 is provided for the purpose of receiving light sensitive members such as films 17 which are shown in place in Figure 6.

When it is desired to remove the films or light sensitive member 17 or to reload the camera, it will only be necessary to unscrew the hemispherical cap 8 and remove or partially remove the spider 15, whereupon the films will drop out automatically and new films may be loaded into the camera. This eliminates the necessity of handling the films after exposure.

The light source or lighting means which as a whole is designated 3 is in the form of a tubular member having a glass wall 18 closed at each end by caps 19 and 20. Cap 19 is of suitable insulating material, the cap 20 of metal. This tubular member passes into the upper end of the camera tube 4 and rests upon a contact spring 21 which in turn seats or rests upon the upper face of the internal partition 14.

The insulating cap member 19 is provided with an electrode 22 and the cap 20 with a similar electrode 23. These electrodes are tapered and secure the ends of a filament 24 in place in the caps 19 and 20. This filament is composed of a highly refractory material, preferably tungsten, and is jammed or clamped at each end between electrodes 22 and 23 and the caps 19 and 20, respectively.

The upper camera 1 comprises a tubular member 25 internally threaded so as to telescope and be threaded upon the threaded portion 13 of tube 4. The walls of the tube 25 are provided with four sets of pin hole apertures or diaphragms 27 similar to the pin hole diaphragms 5 in the lower camera. The lower end of tube 25 is provided with the transverse partition 28 and receives a removable spider 29 which is similar to the spider 15 in the lower camera. The head of spider 29 abuts against the underside of the partition 28, the body portion of the spider extending upwardly through the partition 28 and longitudinally of the tube 25. Spider 29 is also provided with curved surfaces similar to the surfaces or faces 16 in the lower spider 15 for receiving films 30.

Figure 4:
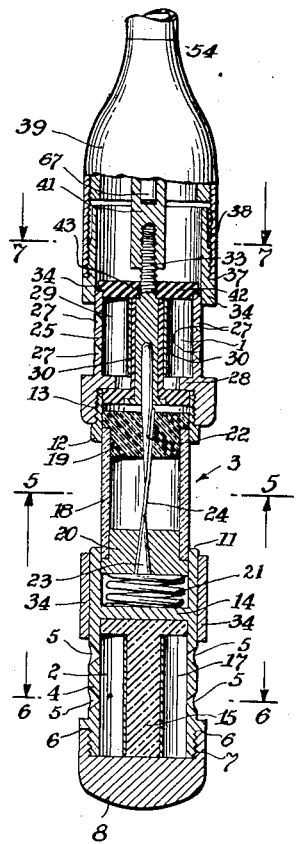
Figure 4 is a section similar to the one in Figure 3 showing the parts in position ready for the making of an exposure, i. e. with the shutter mechanism removed from the diaphragm openings of the cameras.

At its lower end, spider 29 is molded about a short metallic tube 31; the upper end of the electrode 22 extends into this tube 31, as shown in Figures 3 and 4. The spider 29 is furthermore provided at its upper end with a screw threaded member 33 the purpose of which will be described more in detail hereinafter.

The exterior of my apparatus is provided with a shutter mechanism for the two cameras and also the necessary mechanism for shifting the cameras relatively to the shutter. This shutter mechanism comprises a tube 34 surrounding both cameras and cut away intermediate its ends to provide a skeleton portion 35 which lies abreast of 11a of the tubular member 4. The tube 34 has a sliding fit on the camera tubes and when in closed position with the diaphragms 5 covered or closed, as shown in Figure 3, presents a smooth surface for the passage of the device into the cavity to be photographed. This prevents the entry of any foreign material into the diaphragms during the process of insertion of the device into the cavity, while the smooth surface facilitates the insertion of the device and also prevents injury to the membrane of the cavity to be photographed. The upper end of the shutter tube is reduced in diameter to provide a shoulder 37 and threaded externally as shown at 38. Upon this threaded portion 38 is screwed an open ended metal cap 39.

This cap 39 is permanently connected with the rubber tube 54 which connects the photographic cameras with the operating handle in the way shown in Figure 1. This rubber tube 54 contains the shutter operating member which is usually a resilient wire 67 surrounded by the stiffening wire coil 69. This wire 67 is provided at its lower end reaching into cap 39 with the internally threaded tube 41. The screw threaded member 33 secured to spider 39 is threaded into this tube 41 connecting thereby the operating wire 67 with the unitary camera structure consisting of the cameras 1 and 2 and the lighting device 3.

In accordance with the present invention, the upper end of camera 1 is covered by the disc-shaped cover 42 provided with a central screw threaded opening 43. By means of this screw threaded opening 43, cover 42 is secured to the screw threaded member 33, thereby tightly closing the upper open end of camera 1 as shown in Figures 3 and 4.

Thus, it is possible without difficulty to detach the cameras and the shutter mechanism from the operating wire 67 and the rubber tube 54 respectively without exposing to light the films arranged within camera 1. The cameras and the shutter mechanism are detached from wire 67 and rubber tube 54 respectively by simultaneously unscrewing the screw threaded member 33 from tube 41 and the screw threading 38 at the upper end of the shutter tube 34 from cap 39 respectively, without removing cover 42 from the upper end of camera 1.

The soft rubber tube 54, as will be seen from Figure 1, is of substantial length and the upper end thereof is enclosed within a hard rubber or Bakelite housing 56. The latter is provided at its lower end with an insulating cap 57 which encloses tube 54 as illustrated.

The mechanism for operating the shutter and closing the electric circuit of the lighting device 3 is arranged within this housing 56. This operating mechanism consists of the metallic member 58 provided with the tubular extension 59. Sleeve 60 made of insulating material is arranged around the tubular member 59 and the metallic ring-shaped contact member 61 carried by sleeve 60 is thus electrically insulated from the metallic tubular member 59. Another metallic tubular member 62 serves as second contact means. This member is closed at its top 63 and forced away from contact ring 61 by means of the helical spring 64.

Furthermore, an inner tube 65 is arranged within the tubular extension 59 and the tubular contact member 62, as shown in Figure 2. The upper part of this inner tube 65 is thicker than its lower part and abuts against the closed top 63 of the tubular contact member 62, thereby pressing this tubular contact member 62 against contact ring 61 if moved downward in direction of arrow 66.

The top portion of the inner tube 65 is also provided with an external thread and knob 68 is screwed thereto. The operating wire 67 reaches into the hole 69 in knob 68 to the top wall 70 thereof. Thus, by exerting pressure against knob 68 in direction of arrow 66, it is possible to simultaneously move the operating wire 67 downward in direction of arrow 66 and to force the tubular contact member 62 into contact with the ring-shaped contact member 61. This latter member, namely the ring-shaped contact member 61, is connected by wire 71 with the electric circuit of lighting device 3. This electric circuit is also connected directly with the lower electrode 23 of the lighting device 3 by wire 72 which passes through rubber tube 54. In view of the fact that the tubular contact member 62 is in direct contact with the operating wire 67 and the latter in contact with the upper electrode 22, it is evident that by contacting the tubular contact member 62 with the ring-shaped contact member 61, the electric circuit of lighting device 3 is closed and the lighting device operated. After taking of the photograph, knob 68 is released and forced back into inoperative position by action of spring 64. Thus, this new operating mechanism enables simultaneous sliding of the shutter along the camera surface and operation of the lighting device by one single downward movement of knob 68.

It will be understood that each of the elements described above, or two or more together, may also find a useful application in other types of photographic apparatus differing from the types described above.

While I have illustrated and described the invention as embodied in apparatus for photographing cavities of the human body, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and therefore such adaptations should and are intended to be comprehended within the meaning and range of equivalence of the following claims.

What I claim as new and desire to secure by Letters Patent is:

1. In photographic apparatus of the class described, the combination of two tubular cameras provided each with at least one exposure chamber, a tubular lighting device between said cameras secured to one end of each of said cameras and forming with them one unitary camera structure leaving the other ends of said cameras open, a tubular shutter mechanism slidably enclosing said unitary camera structure, a shutter operating mechanism detachably attached on the one hand to the open end of one of said pair of tubular cameras and on the other hand to said shutter mechanism for moving the same relative to said unitary camera structure, a first camera cover detachably secured to said open end of said camera to which said shutter operating mechanism is detachably attached, said first camera cover normally covering said open end of said camera to which said shutter operating mechanism is attached in such a manner that the exposure chamber or chambers in said camera are light-tightly closed also when said shutter operating mechanism is detached from said unitary camera structure and the shutter mechanism slidably enclosing the same, and a second camera cover detachably secured to the open end of the other of said pair of tubular cameras normally covering said open end and light-tightly closing the exposure chamber or chambers within said other camera.

2. In photographic apparatus of the class described, the combination of a tubular end camera and a tubular intermediate camera provided each with at least one exposure chamber, a tubular lighting device between said cameras secured to one end of each of said cameras and forming with the same one tubular unitary camera structure leaving the other ends of said cameras open, a tubular shutter mechanism slidably enclosing said unitary camera structure, a shutter operating mechanism detachably attached to the open end of said intermediary camera and to said shutter mechanism for moving the latter relative to said unitary camera structure, an intermediate camera cover detachably secured to said open end of said intermediate camera, said intermediate camera cover normally covering said open end of said intermediate camera in such a manner that the exposure chamber or chambers in said intermediate camera are light-tightly closed when said shutter operating mechanism is detached from said unitary camera structure and the shutter mechanism slidably enclosing the same, and an end camera cover detachably secured to the open end of said end camera, said end camera cover normally covering said open end of said end camera and light-tightly closing the exposure chamber or chambers within this end camera.

3. In a photographic camera of the type claimed in claim 2, said intermediate camera cover normally covering said open end of said intermediate camera and being disc shaped and provided with a hole for the means by which said shutter operating mechanism is secured to said intermediate camera.

4. In a photographic apparatus of the type claimed in claim 2, a screw threaded member secured to said intermediate camera extending from the open end of said camera co-axially with the same, and said intermediate camera cover being disc shaped and provided with a hole for said screw threaded member by which said shutter operating mechanism is secured to said intermediate camera.

5. In a photographic appartaus of the type claimed in claim 2, a screw threaded member secured to said intermediate camera extending from the open end of said camera co-axially with the same, and said intermediate camera cover being disc shaped and provided with a screw threaded central opening for said screw threaded member, said screw threaded opening being shaped in such a manner that said disc shaped camera cover can be screwed on said screw threaded member entirely covering the open end of said intermediate camera, said screw threaded member simultaneously serving for securing said shutter operating mechanism to said intermediate camera.

6. In a photographic apparatus of the type claimed in claim 2, said end camera cover normally covering said open end of said end camera and having a substantially hemispherical outer surface in order to facilitate introduction of the unitary camera structure into the cavity of the human body of which photographs have to be taken.

7. In a photographic apparatus of the type claimed in claim 2, said end camera cover being made of metal and having a substantially hemispherical outer surface in order to facilitate introduction of the unitary camera structure into the cavity of the human body of which photographs have to be taken.

8. In a photographic camera of the type claimed in claim 2, said intermediate camera cover normally covering said open end of said intermediate camera and being disc shaped and provided with a hole for the means by which said shutter operating mechanism is secured to said intermediate camera, and said end camera cover normally covering said open end of said end camera and having a substantially hemispherical outer surface in order to facilitate introduction of the unitary camera structure into the cavity of the human body of which photographs have to be taken.

9. In a photographic apparatus of the type claimed in claim 2, a screw threaded member secured to said intermediate camera extending from the open end of said camera co-axially with the same, said intermediate camera cover being disc shaped and provided with a hole for said screw threaded member by which said shutter operating mechanism is secured to said intermediate camera, and said end camera cover being made of metal and having a substantially hemispherical outer surface in order to facilitate introduction of the unitary camera structure into the cavity of the human body of which photographs have to be taken.

10. In a photographic apparatus of the type claimed in claim 2, a screw threaded member secured to said intermediate camera extending from the open end of said camera co-axially with the same, said intermediate camera cover being disc shaped and provided with a screw threaded central opening for said screw threaded member, said screw threaded opening being shaped in such a manner that said disc shaped camera cover can be screwed on said screw threaded member entirely covering the open end of said intermediate camera, said screw threaded member simultaneously serving for securing said shutter operating mechanism to said intermediate camera, and said end camera cover being made of metal and having a substantially hemispherical outer surface in order to facilitate introduction of the unitary camera structure into the cavity of the human body of which photographs have to be taken.

11. In photographic apparatus of the class described, the combination of a pair of tubular cameras provided each with at least one exposure chamber, a lighting device between said cameras secured to the same and forming with them one camera unit, a shutter mechanism for said cameras slidably secured to said camera unit, a shutter operating mechanism detachably secured to said camera unit and said shutter mechanism for moving the same relative to each other, separate cover means for the exposure chambers of said cameras closing said exposure chambers light-tightly also when said shutter operating mechanism is detached from said camera unit and the shutter mechanism slidably secured thereto, said apparatus provided with an electric circuit including said lighting device and a source of current, said shutter operating mechanism being constructed in such a manner as to automatically close said electric circuit whenever said shutter mechanism is operated, thereby enabling simultaneous lighting of the cavity of the human body to be photographed and exposure of the films in said tubular cameras by one single movement of said shutter operating mechanism.

12. In a photographic apparatus of the type claimed in claim 1 provided with a electric circuit including said lighting device, a source of current and two contact means, said shutter operating mechanism comprising two operating members arranged slidably along each other, one of said operating members being connected with said shutter mechanism and the other being connected with said unitary camera structure so that by sliding of said operating members along each other said shutter mechanism is moved along said unitary camera structure and is thus operated in the required way, each of said operating members being provided with one of said contact means contacting each other only when said operating members are moved along each other and said shutter mechanism is in operative position enabling exposure of the films in said tubular cameras, said contact means being included in said circuit of said lighting device in such a manner that when they are contacting each other and said circuit is thereby closed, said lighting device is operated and thus the cavity to be photographed is lighted simultaneously with operation of said shutter mechanism.

13. In a photographic apparatus of the type claimed in claim 1 provided with an electric circuit including said lighting device, a source of current and two contact means, said shutter operating mechanism comprising an operating handle with two operating members arranged slidably along each other, one of said operating members being connected with said shutter mechanism and the other being connected with said unitary camera structure so that by sliding of said operating members along each other said shutter mechanism is moved along said unitary camera structure and is thus operated in the required way, each of said operating members being provided with one of said contact means contacting each other only when said operating members are moved along each other and said shutter mechanism is in operative position enabling exposure of the films in said tubular cameras, said contact means being included in said circuit of said lighting device in such a manner that when they are contacting each other and said circuit is thereby closed, said lighting device is operated and thus the cavity to be photographed is lighted simultaneously with operation of said shutter mechanism.

14. In a photographic apparatus of the type claimed in claim 1 provided with an electric circuit including said lighting device, a source of current and two contact rings, said shutter operating mechanism comprising an operating handle with two operating members arranged slidably along each other, one of said operating members being connected with said shutter mechanism and the other being connected with said unitary camera structure so that by sliding of said operating members along each other said shutter mechanism is moved along said unitary camera structure and is thus operated in the required way, each of said operating members being provided with one of said contact rings contacting each other only when said operating members are moved along each other and said shutter mechanism is in operative position enabling exposure of the films in said tubular cameras, said contact rings being included in said circuit of said lighting device in such a manner that when they are contacting each other and said circuit is thereby closed, said lighting device is operated and thus the cavity to be photographed is lighted simultaneously with operation of said shutter mechanism.

15. In a photographic apparatus of the type claimed in claim 1 provided with an electric circuit including said lighting device, a source of current and two contact means, said shutter operating mechanism comprising an operating handle with two operating members arranged slidably along each other, one of said operating members being connected with said shutter mechanism and the other being connected with said unitary camera structure so that by sliding of said operating members along each other said shutter mechanism is moved along said unitary camera structure and is thus operated in the required way, each of said operating members being provided with one of said contact means contacting each other only when said operating members are moved along each other and said shutter mechanism is in operative position enabling exposure of the films in said tubular cameras, said contact means being included in said circuit of said lighting device in such a manner that when they are contacting each other and said circuit is thereby closed, said lighting device is operated and thus the cavity to be photographed is lighted simultaneously with operation of said shutter mechanism, said operating handle furthermore including a spring member forcing said operating members into inoperative position with said contact means out of contact with each other, whenever said shutter operating mechanism is not operated.

FRANZ G. BACK.